United States Patent [19]

Templeton

[11] Patent Number: 5,437,509
[45] Date of Patent: Aug. 1, 1995

[54] BEARING AND SEAL ASSEMBLY FOR TRENCHER ENDLESS CHAIN DRIVES

[75] Inventor: Joe B. Templeton, Farmington, N. Mex.

[73] Assignee: James C. Casey, Farmington, N. Mex.

[21] Appl. No.: 154,278

[22] Filed: Nov. 18, 1993

[51] Int. Cl.[6] .................................................. F16C 33/72
[52] U.S. Cl. .................................. 384/142; 277/92; 384/150
[58] Field of Search ............... 384/130, 142, 149, 150; 277/92

[56] References Cited

U.S. PATENT DOCUMENTS

| | | | |
|---|---|---|---|
| 2,708,800 | 5/1955 | Logus | 37/190 |
| 2,965,217 | 12/1960 | Dommann et al. | 198/203 |
| 3,006,087 | 10/1961 | Lindell | 37/86 |
| 3,086,782 | 4/1963 | Peickii et al. | 277/92 |
| 3,195,900 | 7/1965 | Schoenrock | 384/142 X |
| 3,578,111 | 5/1971 | Miller | 277/92 X |
| 3,668,794 | 6/1972 | Marquardt et al. | 37/8 |
| 3,695,716 | 10/1972 | Meyer | 299/25 |
| 3,750,762 | 8/1973 | Eaton | 37/86 |
| 3,921,962 | 11/1975 | Feger et al. | 277/92 X |
| 4,483,084 | 11/1984 | Caldwell et al. | 37/86 |
| 4,626,032 | 12/1986 | Harris | 299/36 |
| 4,720,929 | 1/1988 | Umberson | 37/91 |
| 4,861,199 | 8/1989 | Hackmack | 405/267 |
| 4,881,829 | 11/1989 | Koelsch | 277/92 X |
| 4,893,464 | 1/1990 | Thuerman | 59/78 |

OTHER PUBLICATIONS

Advertisement, T-800C by Vermeer Manufacturing Co. no date.

*Primary Examiner*—Thomas R. Hannon
*Attorney, Agent, or Firm*—Dennis F. Armijo

[57] ABSTRACT

The disclosure is directed to a bearing and seal assembly apparatus for a endless chain drive for trenchers. The disclosure is particularly directed to the use of such an apparatus in trenchers used in rock or hard packed soils. The apparatus of the present invention uses bearing and seal assemblies that prolong the useful life of the gear box, the drive assembly and ultimately the trencher as a whole.

9 Claims, 1 Drawing Sheet

BEARING AND SEAL ASSEMBLY FOR TRENCHER ENDLESS CHAIN DRIVES

BACKGROUND OF THE INVENTION

1. Field of the Invention (Technical Field)

The present invention relates to a bearing and drive assembly for trenchers, and more particularly to a bearing and drive assembly for rock or hard soil trenchers.

2. Background Art

Chain drive ditchers or trenchers are used for excavating in both sandy or soft soils and rocky or hard soils. U.S. Pat. No. 4,626,032 to Harris, et al., describes a ditcher for excavating hard soils. Problems with current ditchers and trenchers include that the drive assembly for moving the endless chain, during excavation, is exposed to dirt and debris, wearing out parts of the assembly, or is equipped with bushings that likewise do not keep harmful debris from entering into the gear box. This shortens the life of the drive assembly, increases the amount of maintenance and causes the overall efficiency of the ditcher or trencher to decrease as the parts of the assembly wear out. This problem is exacerbated when digging through rocky or hard soils due to the increased load on the mechanism and vibration.

Most endless chain trenchers take power from the engine to a flywheel. Power is transmitted from the flywheel clutch to one or more hydraulic pumps by a driveline and U joint assembly. Hydraulic power is supplied by the pumps to hydraulic motors which in turn rotate the head shaft drive assembly. In the center of the head shaft are drive sprockets that rotate the endless chain assembly.

Existing trenchers do not have adequate seals to keep dirt or debris out of the hood bushings. Additionally, they do not have adequate seals to keep grease on the bushings. Most bushings for drives must be lubricated by applying grease externally to the bushings. Once the grease is on, there is nothing to keep it on the bushing or to keep dirt and debris from collecting on the grease. The bushings themselves do not have enough surface area to withstand the load and the vibration of the boom.

There are similar problems with the head shaft and bearing assemblies. The lack of sealing allows dirt and debris to enter the head shaft boxes. Lubrication is accomplished by pumping grease through a tube to the hood bushings and head shaft bearings. The lower final drives are lubricated in the same manner.

SUMMARY OF THE INVENTION (DISCLOSURE OF THE INVENTION)

In accordance with the present invention, there is provided a bearing and seal assembly for trenchers with endless chain drives, and more particularly for rock or hard soil trenchers that undergo high impact or vibration during trenching. The preferred hood bearing and seal assembly for an endless digging chain drive of a trencher comprises a hood bearing for rotatably holding a drive shaft to a hood housing, a hood bearing cover plate for holding the hood bearing in place, dual-cone seal for keeping lubricating fluid on a drive assembly and for keeping dirt and debris from entering the drive assembly, and structure for lubricating the hood bearing.

The preferred hood bearing comprises a bearing with surface area sufficient to support weight of a boom of a trencher and to withstand shock and vibration from digging hard surfaces with the trencher.

The preferred apparatus further comprises a first O ring between the hood bearing and the hood bearing cover plate.

The preferred dual-cone seal comprises a seal adjuster. The preferred seal adjuster comprises an adjusting plate, a rotation flange, at least one adjusting screw, and at least one dowel pin affixed to the rotation flange and adjustably inserted into the drive shaft. The preferred seal adjuster further comprises a second O ring between the rotation flange and the drive shaft. The preferred seal adjuster comprises structure for applying a preselected pressure on the dual-cone seal.

The preferred apparatus further comprises structure for lubricating the drive assembly. The preferred structure for lubricating the drive assembly comprises an enclosed drive assembly containing lubricating fluid.

The preferred method of using a hood bearing and seal assembly for an endless digging chain drive of a trencher comprises the steps of providing a hood bearing for rotatably holding a drive shaft to a hood housing, holding the hood bearing in place with a hood bearing cover plate, sealing a drive assembly from lubricating fluid leaks and for keeping dirt and debris from entering the drive assembly with a dual-cone seal, and lubricating the hood bearing.

The step of providing a hood bearing preferably comprises providing a bearing with a surface area sufficient to support weight of a boom of a trencher and to withstand shock and vibration from digging hard surfaces with the trencher.

The preferred method further comprises the step of placing a first O ring between the hood bearing and the hood bearing cover plate.

The step of sealing preferably comprises adjusting a pressure on the dual-cone seal. The preferred step of adjusting comprises the steps of providing an adjusting plate, providing a rotation flange, providing at least one adjusting screw, and providing at least one dowel pin affixed to the rotation flange and adjustably inserted into the drive shaft. The sealing step further comprises the step of placing a second O ring between the rotation flange and the drive shaft. The step of adjusting preferably comprises applying a preselected pressure on the dual-cone seal.

The preferred method further comprises the step of lubricating the drive assembly. The step of lubricating the drive assembly preferably comprises providing an enclosed drive assembly containing lubricating fluid.

Other objects, advantages, and novel features, and further scope of applicability of the present invention will be set forth in part in the detailed description to follow, taken in conjunction with the accompanying drawing, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWING

The accompanying drawing, which is incorporated into and forms a part of the specification, illustrates several embodiments of the present invention and, together with the description, serves to explain the principles of the invention. The drawing is only for the purpose of illustrating a preferred embodiment of the invention and is not to be construed as limiting the invention.

DESCRIPTION OF THE PREFERRED EMBODIMENTS (BEST MODES FOR CARRYING OUT THE INVENTION)

The trencher drive assembly of the present invention provides an improvement to existing technology. The invention is useful for increasing the efficiency of trenchers and more importantly for increasing the useful life of the drive for endless chains. This second aspect is of particular importance for trenchers used in hard or rocky soil.

Figure 1:
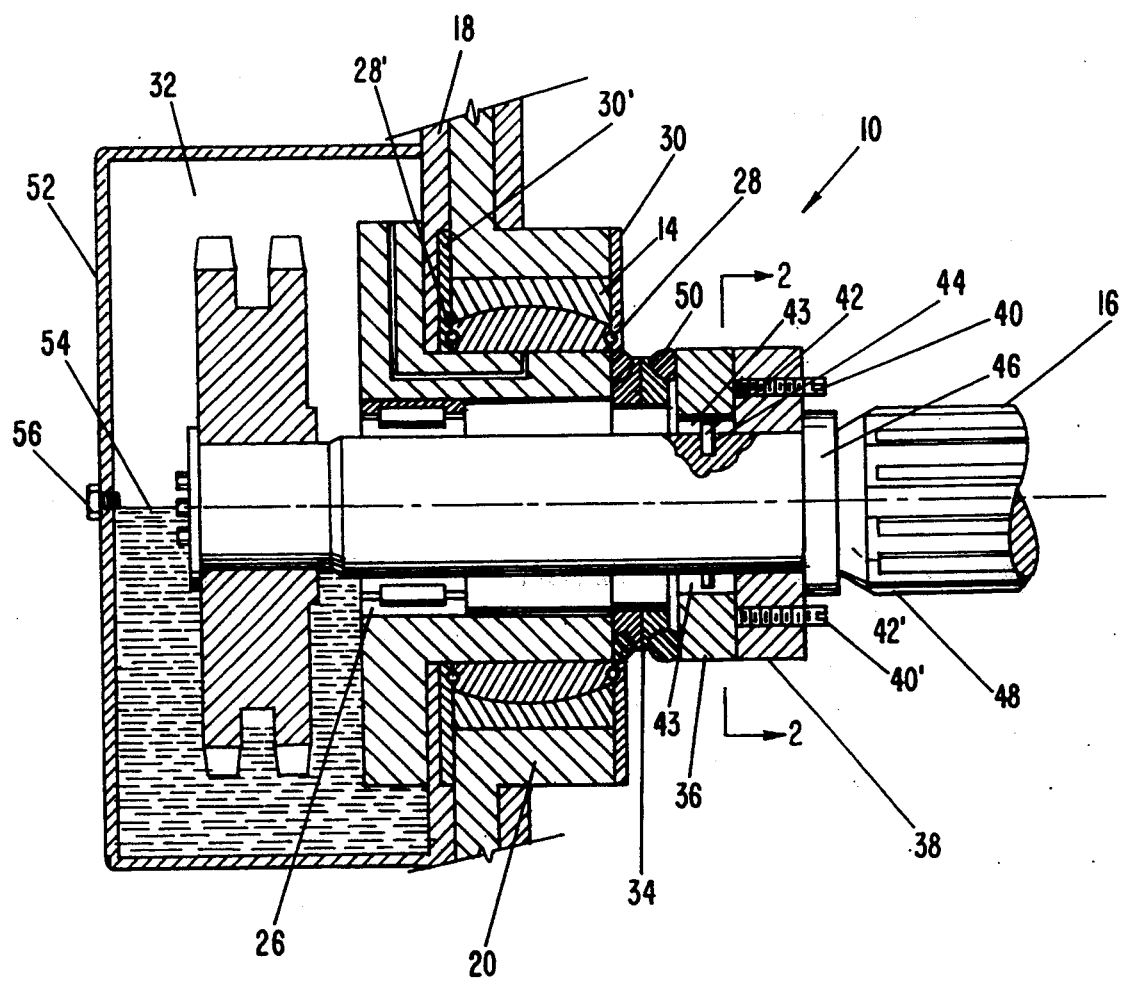
FIG. 1 is a sectional view showing the preferred embodiment of the present invention.
Figure 2:
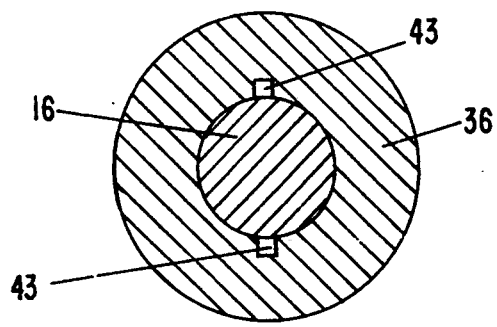
FIG. 2 is a cross-sectional view along A—A of FIG. 1.

The preferred embodiment of the invention is shown in FIG. 1. FIG. 1 shows trencher endless chain drive 10 with the preferred bearing/seal assembly. Hood bearing 14 is placed around shaft 16 and against hood bearing flange 18. Hood bearing flange 18 preferably should be approximately 18 inches in diameter for most rock trenchers. Hood bearing 14 is selected so that the surface area of the bearing is sufficient to withstand the weight of the trencher boom (not shown) and the shock and vibration of the endless chain (not shown). The preferred bearing is a 6 inch diameter, 2½ inch wide oval shaped bearing and race that are well known in the art. Most existing trenchers cannot withstand the forces placed on shaft 16 causing damage to the existing hood plate. Therefore, for existing trenchers a reinforcing hood plate 20 must be added. For most trenchers a 1½ inch plate or the like is sufficient. Inner head shaft bearing 26 is placed between shaft 16 and bearing flange 18. Bearing flange 18 holds inner head shaft bearing 26 in place and also holds hood bearing 14 in place. O ring seal 28 is placed between bearing cover plate 30 and hood bearing 14 to keep dirt and other foreign matter out of gear box 32 and lubricating fluid in. A second O ring seal 28' can be placed between a second bearing cover plate 30' and hood bearing 14 as shown in FIG. 1. Dual-cone seal 34, such as those manufactured by Caterpillar Inc., is placed around shaft 16 and against hood bearing 14 to keep dirt from entering gear box 32 and to keep oil form escaping gear box 32. A preselected pressure, such as 15 p.s.i., is maintained on the dual-cone seal 34 by seal rotation flange 36, seal adjusting plate 38 and adjusting screws 40 and 40'. Seal rotation flange 36 rotates with shaft 16 due to dowel pins 42 and 42' inserted into elongated slots 44 and 44' in shaft 16. Dowel pins 42 and 42' are affixed to seal rotation flange 36 with grooves in the seal rotation flange to allow seal rotation flange to slide on shaft 16 with the grooves aligned with dowel pins 42 and 42' as shown in FIG. 2. Pressure is applied to dual-cone seal 34 by tightening adjusting screws 40 and 40' to the desired tension. When screws 40 and 40' are tightened, seal adjusting plate 38 presses against shaft stop 46 or onto the tapered portion 48 of shaft 16. O ring seal 50 can be added to seal rotation flange 36 to keep oil from transferring between flange 30 and shaft 16. To lubricate gear box 32 cover plate 52 is sealed and filled with lubricating fluid 54 to a level to cover approximately one half of the diameter of shaft 16. Lubricating fluid 54 is poured through filler plug 56 until the desired level is reached.

The present invention can be used to modify existing trencher endless chain drives or can be incorporated in new models.

EXAMPLE (INDUSTRIAL APPLICABILITY)

The invention is further illustrated by the following non-limiting example.

To demonstrate the reliability of the bearing and seal assembly of the present invention the following before and after data was obtained using a standard 1030L Trenco Jetco Rock Trencher:

| SERVICE HOURS | TYPE OF FAILURE |
| --- | --- |
| 304 | Lost final drive chain link on right outer final drive on crawler |
| 842 | Lost right inner final drive sprocket bearings |
| 862 | Lost left outer final drive bearings |
| 1115 | Lost hood bushing and head shaft bearings in upper part, inner and outer final drive bearings and drive chain worn out |

After examination of the affected parts after the 1115 service hour failures it was discovered that the reasons for the failures were that dirt was entering into the hood bushings and head shaft boxes and there was no structure to keep the grease in the bushings. Additionally it was discovered that the bushings did not have enough surface to carry the load of the trencher boom when in operation on hard rock surfaces.

The trencher was then modified utilizing the embodiment of FIG. 1. After 334 hours of use over similar conditions used prior to modification, an oil analysis was conducted on the oil in the chain drive bearing/seal and normal wear particles were found. A similar oil analysis was conducted after every succeeding 150 hours with similar normal results. The trencher underwent 1000 hours of operation without a failure. A second MODEL ECT. rock trencher was similarly modified and similar test data was taken. This trencher did not have any failures to the modified drive assembly after 3000 hours of operation.

The preceding example can be repeated with similar success by substituting the generically or specifically described reactants and/or operating conditions of this invention for those used in the preceding example.

Although the invention has been described with reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by reference.

What is claimed is:

1. A hood bearing and seal assembly for an endless digging chain drive of a trencher comprising:

hood bearing means for rotatably holding a drive shaft to a hood housing;

hood bearing cover plate means for holding said hood bearing means in place;

dual-cone sealing means for keeping lubricating fluid on a drive assembly and for keeping dirt and debris from entering the drive assembly; and lubricating means for lubricating said hood bearing means.

2. The invention of claim 1 wherein said hood bearing means comprises bearing means with surface area sufficient to support weight of a boom of a trencher and to withstand shock and vibration from digging hard surfaces with the trencher.

3. The invention of claim 1 further comprising a first O ring means between said hood bearing means and said hood bearing cover plate means.

4. The invention of claim 3 further comprising a second O ring means between said hood bearing means and a second hood bearing cover plate means.

5. The invention of claim 1 wherein said dual-cone sealing means comprises seal adjusting means.

6. The invention of claim 5 wherein said seal adjusting means comprises:
   an adjusting plate;
   a rotation flange;
   at least one adjusting screw; and
   at least one dowel pin affixed to said rotation flange and adjustably inserted into the drive shaft.

7. The invention of claim 5 wherein said seal adjusting means comprises means for applying a preselected pressure on said dual-cone sealing means.

8. The invention of claim 1 further comprising means for lubricating the drive assembly.

9. The invention of claim 8 wherein said means for lubricating the drive assembly comprises an enclosed drive assembly containing lubricating fluid.

* * * * *